US007047412B2

(12) United States Patent
Echizen et al.

(10) Patent No.: US 7,047,412 B2
(45) Date of Patent: May 16, 2006

(54) DIGITAL WATERMARK DATA EMBEDDING METHOD, AND DIGITAL WATERMARK DATA EMBEDDABILITY ANALYZING METHOD

(75) Inventors: Isao Echizen, Yokohama (JP); Hiroshi Yoshiura, Tokyo (JP); Ryoichi Sasaki, Fujisawa (JP); Shinichiro Harano, Yokohama (JP); Shinobu Eikawa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 09/798,928

(22) Filed: Mar. 6, 2001

(65) Prior Publication Data

US 2002/0007403 A1 Jan. 17, 2002

(30) Foreign Application Priority Data

Jul. 6, 2000 (JP) ........................ 2000-205512

(51) Int. Cl.
*H04L 9/00* (2006.01)
*G06K 9/36* (2006.01)
*G06K 9/54* (2006.01)

(52) U.S. Cl. .................. 713/176; 705/75; 382/282; 382/285; 382/305; 382/306

(58) Field of Classification Search ............. 713/176, 713/168; 283/13; 382/276–308, 100, 232; 705/75, 57, 58, 59; 380/54
See application file for complete search history.

(56) References Cited

U.S. PATENT DOCUMENTS 5,933,798 A 8/1999 Linnartz 6,415,041 B1 7/2002 Oami et al.
6,590,996 B1 * 7/2003 Reed et al. ............... 382/100

FOREIGN PATENT DOCUMENTS

| EP | 0 840 513 | 5/1998 |
|---|---|---|
| EP | 0 926 897 | 6/1999 |
| EP | 0 980 179 A1 | 2/2000 |
| GB | 2 325 765 | 12/1998 |
| JP | 11-346302 | 12/1999 |
| JP | 2000-059604 | 2/2000 |

OTHER PUBLICATIONS

"Maintaining Image Quality in Digital Watermarking Based on Contour Preserving", I. Eichizen et al, Information Processing Society of Japan, Journal vol. 41, No. 6, pp. 1828–1839, Jun. 2000.

* cited by examiner

Primary Examiner—Kambiz Zand
(74) Attorney, Agent, or Firm—Antonelli, Terry, Stout and Kraus, LLP

(57) ABSTRACT

To lighten the processing load of embedding a digital watermark in content data, a preliminary process (embedding strength map generating process) run by a preprocessing section and the main process (digital watermark embedding process) run by a man processing section are run mutually independently. Specifically, the preliminary process of the preprocessing section is run each time new content data is stored to the content data database, and the main process of the main processing section is run when a content delivery request is received from a receiving terminal (client).

12 Claims, 7 Drawing Sheets

FIG.1

CONTENT DISTRIBUTION SYSTEM

DIGITAL WATERMARK DATA EMBEDDING METHOD, AND DIGITAL WATERMARK DATA EMBEDDABILITY ANALYZING METHOD

This application claims a priority based on Japanese Patent Application No.2000-205512 filed on Jul. 6, 2000, the entire contents of which are incorporated herein for all purposes.

BACKGROUND OF THE INVENTION

The present invention relates to a digital watermarking technology for embedding information in still images, moving picture (video) images, and other types of content.

The need to ensure copyright protection of still pictures, video content, and other digitally recorded content has driven recent advances in digital watermarking technology. Digital watermarking is a technology for embedding a digital watermark in content data, which is typically accomplished by changing a feature value of a specific part of the content data according to predefined rules for each bit of the digital watermark bitstream. With this method the digital watermark cannot be extracted from the content data without using at least the above rules. For example, if information about the creator (author) of the image data is embedded as the digital watermark information to a location in the image data determined according to the above rules in a format whereby the digital watermark is not visible, the author of the image data can be identified by extracting this information from the place defined according to said rules in the image data.

The principle used by a conventional digital watermarking technology to embed information in image data is described below with reference to FIG. 7.

Figure 7:
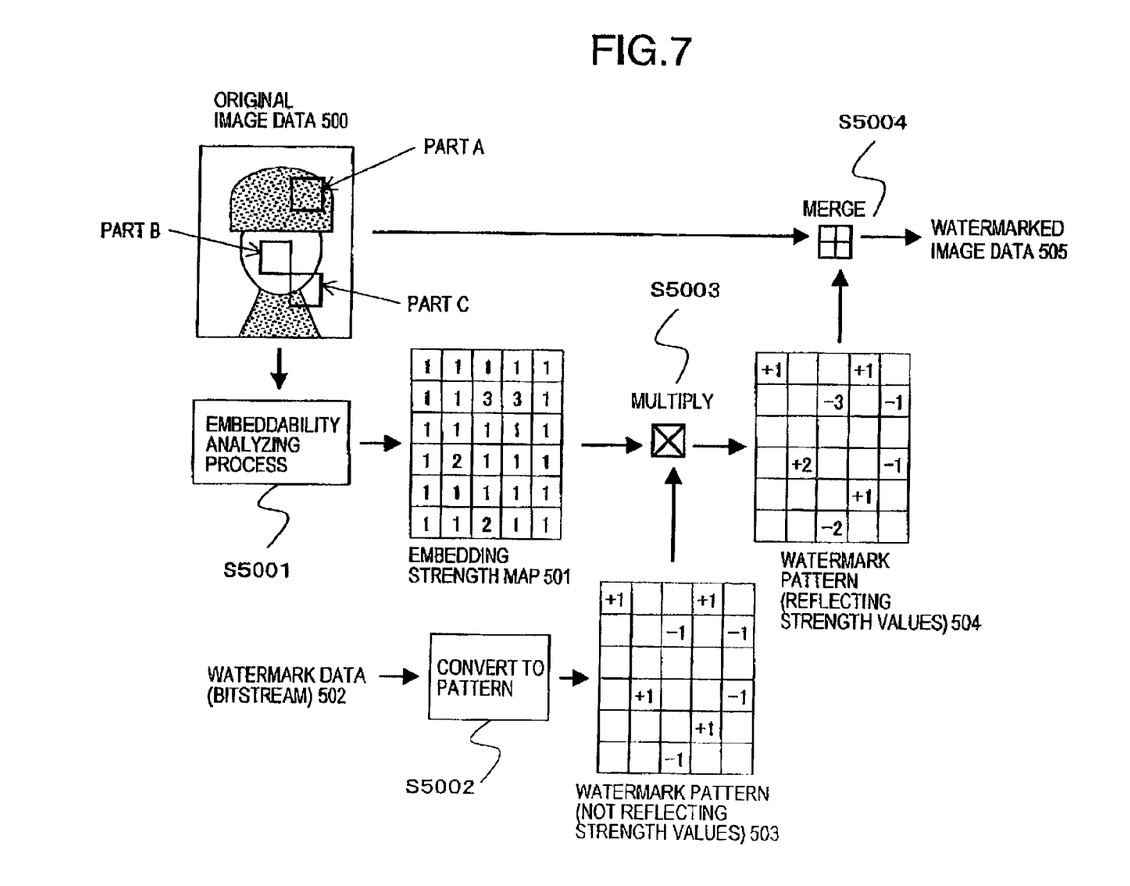
FIG. 7 is used to describe the principle of embedding data to image data using a digital watermarking technology according to the related art.

Referring to FIG. 7, an embeddability analysis process (further described below) is applied to the original image data 500 to generate an embedding strength map 501. This embedding strength map 501 indicates, for each part of the original image data 500, how much a selected feature value (such as luminance) can be changed to embed the digital watermark in a particular part of the original content data (step S5001).

The bits of the watermark data 502 bitstream are then arranged to the parts in the original image data selected according to the predefined rules, and a watermark pattern 503 is generated (step S5002). Note that this map uses +1 to indicate an arranged bit, with a bit value of 1, −1 to indicate an arranged bit with a bit value of 0, and 0 to indicate where no bit is arranged.

The embedding strength map 501 and watermark pattern 502 are then multiplied together to produce watermark pattern 504. Watermark pattern 504 indicates the change in the selected feature value at each location, and is used to embed each bit of the watermark data 502 to a corresponding location in the original image data (step S5003).

The original image data 500 and watermark pattern 504 are then merged. This changes the feature value of each part (image area) of the original image data where the watermark is located with the amount of change determined by the watermark pattern 504 data for that part (image area) (step S5004).

The embeddability analyzing process used in step S5001 above is described next. As noted above, the embeddability analyzing process is a process for generating an embedding strength map, which is a table of values obtained by measuring, for all parts of the content data, the allowed change in the feature value of the parts that can be used for embedding a watermark. For simplicity below let the content data be image data, and luminance be the feature value used for embedding bit values.

The allowed change in the feature value in this example is the amount of change in the luminance (that is, a gradation change) that will not be visible to the eye. Referring to FIG. 7, experience has demonstrated that a large change in luminance is not visibly conspicuous in image areas A with a large high frequency component (such as dark hair), but is visibly obvious in areas B where there are few high frequency components (such as the cheeks) and in contour areas C. It is further known that while the luminance change is great in all directions in image areas where the high frequency component is large, there is little change in the luminance value in all directions where the high frequency component is small, and while the luminance change is great along vectors crossing contours, there is little luminance change along vectors following the contour. These characteristics can therefore be used to detect the luminance change on a plurality of predetermined vectors for each part of the image data, and set the allowed change in the feature value for each said part so that the allowed change becomes smaller as the smallest change in the feature value becomes smaller.

Embeddability analyzing processes are described more fully in the following paper written by the present inventors and others, "Method for maintaining digital watermark image quality based on contour preservation" (in Japanese), Echizen Isao, Yoshiura Hiroshi, Anzai Kohzuke, Taguchi Jun'ichi, Kurozu Yutaka, Sasaki Ryoichi, Tezuka Satoru, Transactions of the Information Processing Society of Japan, Vol. 41, No. 6, pp 1828–1839, 2000.

Conventionally, the sequence of steps S5001 to S5004 shown in FIG. 7 is performed as a single process for embedding digital watermark data in image data. That is, all steps of this embeddability analyzing process are performed each time a digital watermark is embedded in the image data.

When delivering or distributing content data to plural users, the need to detect illegal copies has in particular made it desirable to embed user information (that is, information about the purchaser to whom the content data is delivered or distributed) in the content data. This means that the embeddability analyzing process according to the related art as described above is performed for the same content data every time the content data is distributed or delivered. As further noted above, this embeddability analyzing process includes a procedure for measuring the allowed change in a particular feature value for each part or area of the content data. This means that the processing overhead of the pattern generating process, for example, is high. Repeating this process the same number of times the content data is distributed or delivered simply makes the processing load that much greater.

There is also the desire to embed watermark data in real time to image data captured with a video camera for live broadcasting, for example, so that the live video is broadcast with the watermark embedded in the signal. Copyright protection concerns make it further preferable to embed this watermark data in each frame of image data output sequentially from the video camera. However, the high overhead of the above-described embeddability analyzing process and need for compatibility with extant systems means that an extremely high priced, high performance processing apparatus is needed by the related art.

SUMMARY OF THE INVENTION

Therefore, the present invention provides technology for embedding a digital watermark to content data with greater efficiency than the related art. More particularly, the present invention relates to technology for reducing the processing load of the embeddability analyzing process performed in conjunction with embedding different watermark data to the same content data. The load of the embeddability analyzing process itself, and particularly the load of the embeddability analyzing process applied to image data consisting of plural data frames, is reduced.

A first aspect of the present invention separates the process for embedding watermark data to content data into two processes, a preparation process and a main process.

An embeddability analyzing process is applied to the content data in the preliminary process. This process creates a embedding strength map containing values indicating the change allowed in a feature value for each part of the content data. This allowed change value is the change permitted in the feature value to embed the bits of the digital watermark data bit sequence. The resulting map is the stored with correlation to the content data. The main process embeds the digital watermark data in the content data by changing, for each bit of the digital watermark data bit sequence, the feature value of the content part determined according to specific rules. The specific change in the feature value is determined according to the bit value of the digital watermark data bit, and the allowed change in the feature value stored of that part in the embedding strength map stored with correlation to the same content data.

The preliminary process is accomplished for each content data unit. The main process is applied to the content data independently of the preliminary process for each digital watermark.

The embeddability analyzing process is therefore needed only once to embed plural different digital watermarks to the same content data at different times, and the associated processor load is therefore lower compared with a method according to the related art. The embedding strength map for any same content data is the same irrespective of the digital watermark data to be embedded. Therefore, the embedding strength map compiled by the preliminary process for particular content data can be used for each of plural different digital watermarks to be embedded in the same content data.

An embeddability analyzing process according to a second aspect of the invention compiles an embedding strength map as follows.

For at least one of embedding parts of bits of the electronic data, the allowed change in a feature value of a particular part of the content data corresponding to the embedding part is first determined (a first step). Said embedding parts are determined by predetermined rules (used to generate the watermark pattern). Namely, said embedding parts are indicated by the watermark pattern.

Based on the obtained allowed change values, the allowed change is estimated for each of the embedding parts other than the at-least-one embedding part indicated by the watermark pattern (second step).

The simplest estimating method when allowed change values are obtained for two or more embedding parts, for example, is to use the average of the measured values as the allowed change for each of the other embedding parts indicated by the watermark pattern. The embedding strength map is then compiled using the measured or estimated allowed changes for all of the embedding parts indicated by the watermark pattern (third step). To prevent the watermark pattern from being derived from the embedding strength map, a desired allowed change is preferably also set for parts other than the embedding parts indicated by the watermark pattern.

Compared with measuring the allowed change values for all parts of the content data as in a conventional embeddability analyzing process as described above, the method of the present invention enables faster processing because the location for which the allowed feature value change values are actually measured is at least one of the embedding parts indicated by the watermark pattern.

An embeddability analyzing process for creating an embedding strength map for content data comprising plural frames according to a third aspect of the present invention is described next A plural frame satisfying specific conditions is sequentially selected from the beginning of the plural data frames constituting the content data (first step). For example, one data frame is captured every specific number of frames in sequence from the beginning of the frames in the content data. Alternatively, the similarity between a candidate data frame and a reference data frame is detected, and if the similarity is less than a particular threshold value, the candidate data frame is captured while resetting the candidate data frame as the reference frame for comparison with the next-captured candidate frame. An embedding strength map is then generated for the captured frame. As described above, this embedding strength map stores the allowed change in the feature value of the content data when embedding the bits of the digital watermark data in the captured frame (second step). This embedding strength map is then used as the embedding strength map for all frames from the captured frame for which the map was compiled to the frame before the next captured frame for which a different map is compiled (third step).

Thus comprised, it is not necessary to generate a embedding strength map for every frame of content data comprising plural data frames. Processing is therefore faster than the embeddability analyzing process according to the related art.

These and other benefits are described throughout the present specification, A further understanding of the nature and advantages of the invention may be realized by reference to the remaining portions of the specification and the attached drawings,

DESCRIPTION OF THE PREFERRED EMBODIMENTS

A first preferred embodiment of the present invention is described below with reference to the accompanying figures using by way of example the digital watermark embedding method of the present invention as applied in a content distribution system.

Figure 1:
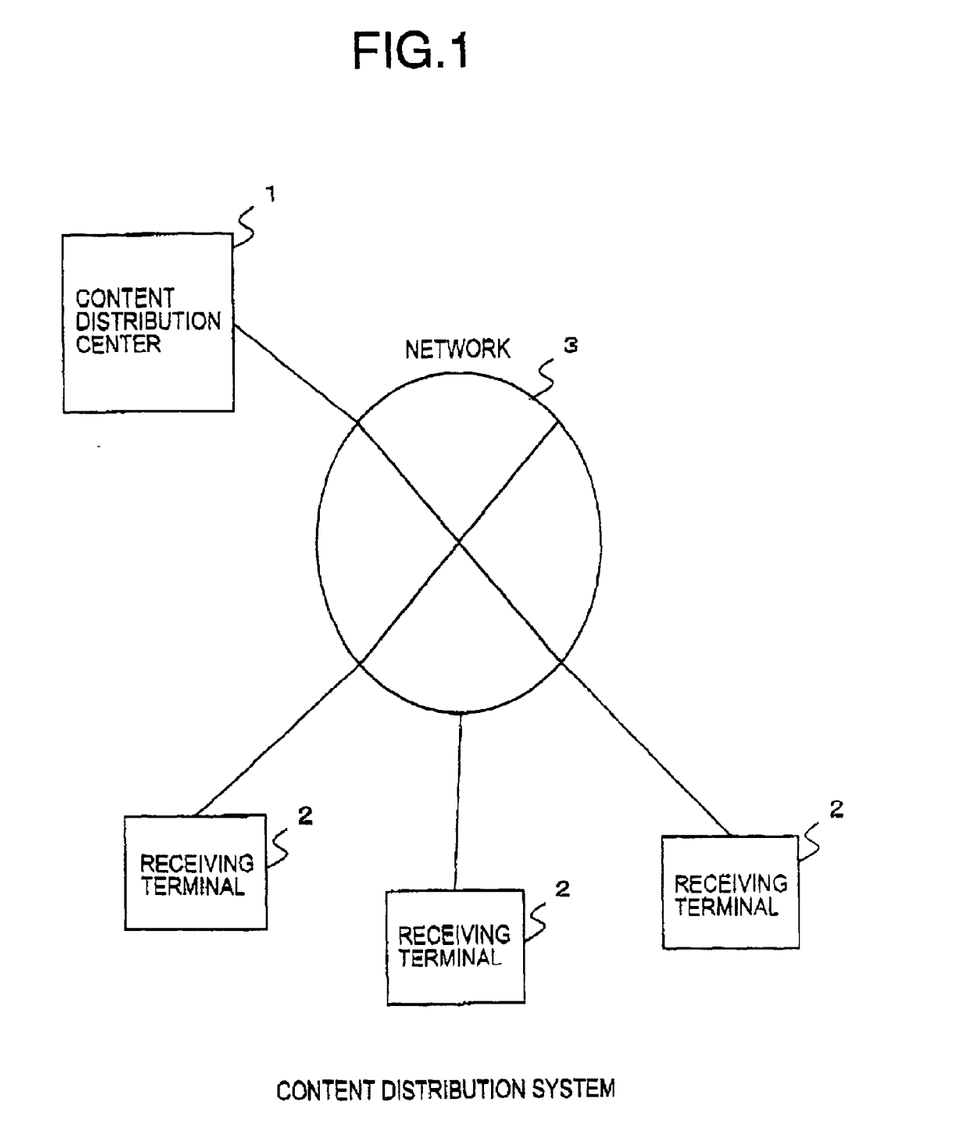
FIG. 1 is a schematic diagram of a content distribution system in which the first embodiment of the present invention is used.

FIG. 1 is a schematic diagram of a content distribution system in which the first embodiment of the present invention is used. As shown in FIG. 1, this content distribution system comprises a content distribution center 1 connected to a plurality of receiving terminals 2 by way of an intervening network 3.

The content distribution center 1 applies an embeddability analyzing process to all content available for distribution to generate corresponding embedding strength maps, and stores the embedding strength maps correlated to the particular content. When a content delivery request is then received from a receiving terminal 2, the content distribution center 1 creates a digital watermark containing user information, that is, information about the receiving terminal 2 that sent the content delivery request. It then embeds this digital watermark in the content requested for delivery according to the embedding strength map prepared for the requested content and predefined rules (rules for generating a watermark pattern), and thus generates watermarked content. This watermarked content is then transmitted to the receiving terminal 2 that sent the content delivery request.

This content distribution center 1 is described in further detail below. The receiving terminal 2 can be any device that has a function for communicating with the content distribution center 1 via the network 3, and detailed description thereof is thus omitted below.

Figure 2:
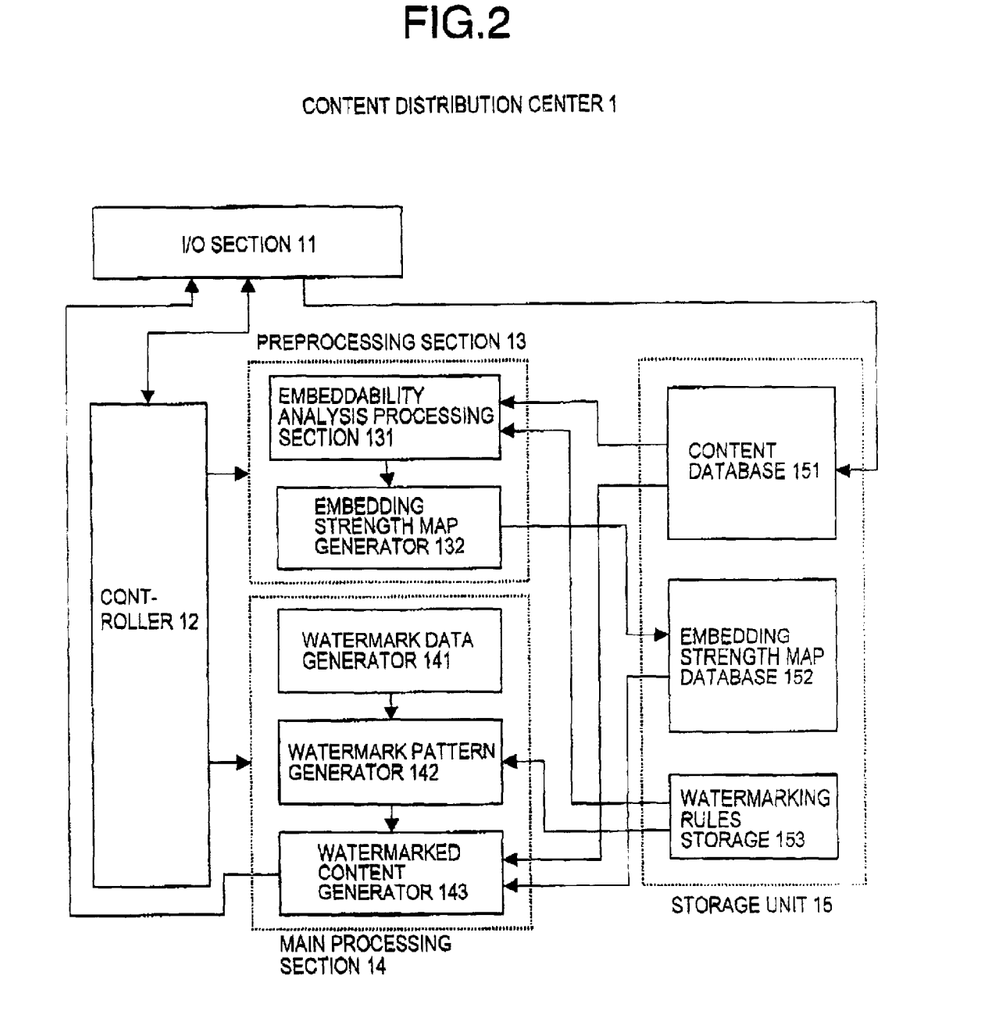
FIG. 2 is a schematic diagram of the content distribution center 1 shown in FIG. 1.

FIG. 2 is a block diagram of the content distribution center 1.

As shown in FIG. 2 the content distribution center 1 has an input/output section 11, preprocessing section 13, main processing section 14, storage unit 15, and a controller 12 for systematically controlling these various components. The I/O section 11 accepts original content data from a keyboard or other input device or a network 3 for delivery to a receiving terminal 2, and transmits watermarked content to the receiving terminal 2 via the network 3.

The storage unit 15 has a content database 151 for storing original content data: an embedding strength map database 152 for storing the embedding strength maps for each content stored to content database 151; and watermarking rules storage 153 for storing the watermarking rules used for generating the watermark pattern embedded to the content data.

The preprocessing section 13 has an embeddability analysis processing section 131 for applying an embeddability analyzing process to each content data stored in content database 151; and an embedding strength map generator 132 for generating the embedding strength maps based on the results returned by the embeddability analysis processing section 131.

The main processing section 14 has a watermark date generator 141 for generating watermark data, a watermark pattern generator 142, and a watermarked content generator 143. The watermark pattern generator 142 creates a watermark pattern by converting the watermark data produced by the watermark data generator 141 to a watermark pattern according to the watermarking rules stored to watermarking rules storage 153. The watermarked content generator 143 produces the watermarked content by embedding the watermark data in the content data using the embedding strength map stored in the embedding strength map database 152 and the watermark pattern generated by the watermark pattern generator 142.

Figure 3:
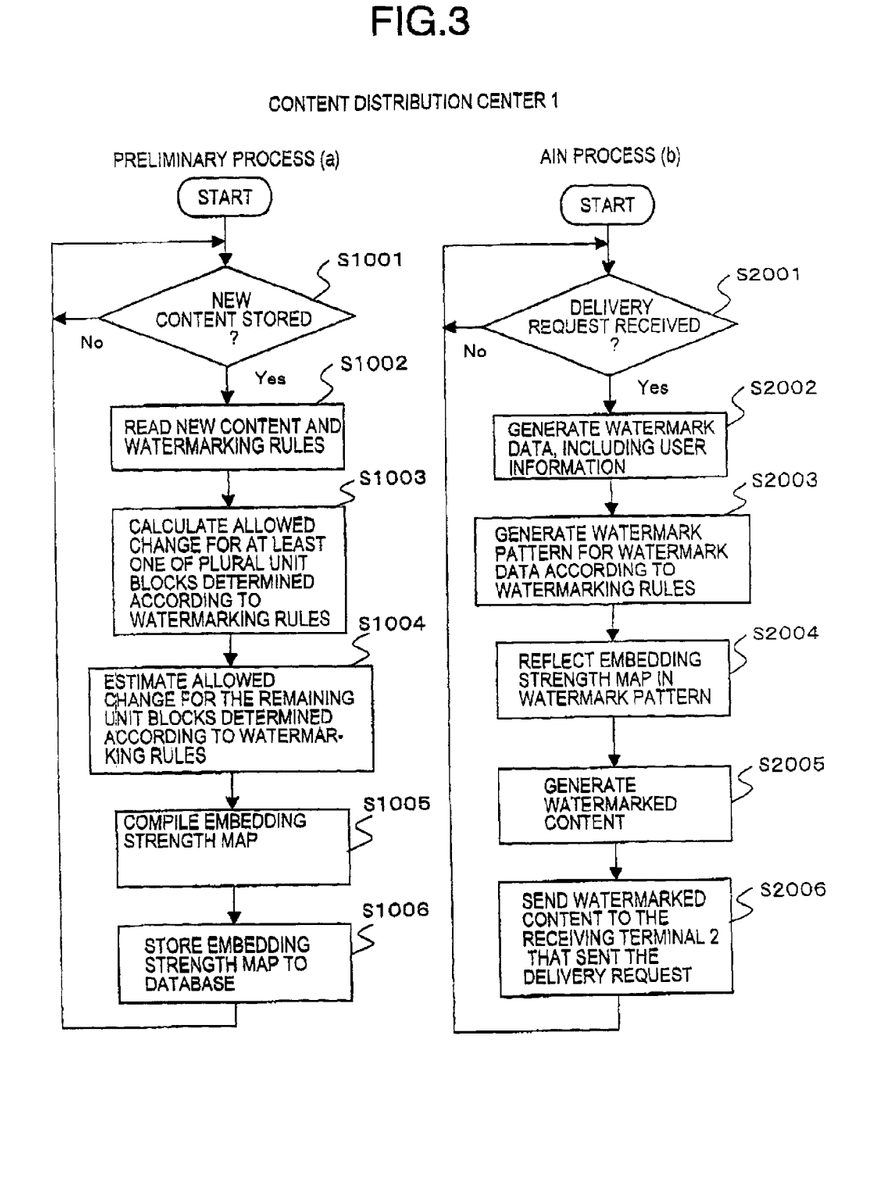
FIG. 3 is a flow chart of the operation of the content distribution center 1 shown in FIG. 2.

FIG. 3 is a flow chart of the operation of the content distribution center 1 as described above. As will be known from FIG. 3, the content distribution center 1 accomplishes two processes: a preliminary process (a) executed by the preprocessing section 13, and a main process (b) accomplished by the main processing section 14.

The preliminary process (a) is described first below.

When new content data (original content data) is stored from the I/O section 11 to the content database 151 (step S1001), the controller 12 instructs the preprocessing section 13 to create an embedding strength map for the newly stored content data.

When the preprocessing section 13 receives this command, embeddability analysis processing section 131 reads the newly stored content data from content database 151, and reads the watermarking rules from watermarking rules storage unit 153 (step S1002).

The content data is divided into unit blocks, which are the unit areas to which one bit of the watermark data (a bit sequence) is embedded. For at least one of unit blocks (unit blocks to which the bits of the watermark data are embedded) defined according to the watermarking rules, the allowed change in the feature value (such as luminance value or chrominance value if the content is image data) of a unit block is then obtained (step S1003). Note that this allowed change obtaining operation is basically the same as that of the embeddability analyzing process described in the related art.

Next, for each unit block determined according to the watermarking rules other than the unit blocks for, which the allowed change was measured in step S1003, the embeddability analysis processing section 131 estimates the allowed change the feature value of the unit block based on the allowed change data obtained in step S1003 (step S1004). For example, if the allowed change is measured for only one block in step S1003, the value of that change is used as the estimate value. If the allowed change is measured for two or more blocks in step S1003, the average of the measured values is used as the estimate value.

Note, further, that if the allowed change in the feature value is measured for each of the unit blocks defined according to the watermarking rules in step S1003, the estimation step in step S1004 is unnecessary.

The embedding strength map generator 132 writes the allowed change in the feature value of each unit block obtained in step S1003 or estimated in step S1004 to the corresponding unit blocks determined according to the watermarking rules in a map obtained by dividing the content data into the unit blocks as noted above. The result of this step is an embedding strength map 501 as shown in FIG. 7 (step S1005). So that the watermarking rules cannot be deduced from the embedding strength map 501, a particular allowed change value is preferably set for each of the unit blocks other than the unit blocks determined according to the watermarking rules in the embedding strength map 501.

After generating the embedding strength map 501 as described above, the embedding strength map generator 132 stores the map in the embedding strength map database 152 so that the correlation to the content data read in step S1002 can be known (step S1006).

The main process (b) is described next.

Note that this main process (b) is run independently of the above preliminary process (a).

When a content delivery request is received from the receiving terminal 2 by way of I/O section 11 (step S2001), the controller 12 passes the user information and content identification data contained in the request to the main processing section 14, and instructs the main processing section 14 to generate watermarked content.

The watermark data generator 141 then generates watermark data containing the user information and content identification data received from the controller 12 (step S2002), and passes the watermark data to he watermark pattern generator 142. The watermark pattern generator 142 then reads the watermarking rules from watermarking rules storage 153. The watermark pattern generator 142 then arranges the bits of the bit sequence representing the watermark data to the unit blocks of the content (the unit blocks to which the bits of the watermark data are to be embedded) determined according to the watermarking rules, and generates a watermark pattern 503 as shown in FIG. 7 (step S2003). As described above with reference to FIG. 7, +1 indicates a arranged bit with a bit value of 1, −1 indicates an arranged bit with a bit value of 0 bit, and 0 indicates where no watermark data bit is arranged.

After the watermark pattern 503 is produced, watermarked content generator 143 reads the embedding strength map 501 for the content identified by the content identification data passed from the controller 12 from the embedding strength map database 152, and multiplies the embedding strength map 501 with the watermark pattern 503. This results in a watermark pattern 504 as shown in FIG. 7 (step S2004). Note that this watermark pattern 504 shows the change in the feature value of each unit block whereby each bit of the watermark data is embedded in the corresponding unit blocks of then requested content. The content data identified by the content identification data passed from the controller 12 is then read from content database 151 and merged with the watermark pattern 504 to change the feature value of each unit block of the content data the amount indicated for that unit block by the watermark pattern 504. The result is watermarked content having the watermark data generated by the watermark data generator 141 embedded therein (step S2005).

The watermarked content is then transmitted through the I/O section 11 to the receiving terminal 2 that sent the content delivery request (step S2006).

Figure 4:
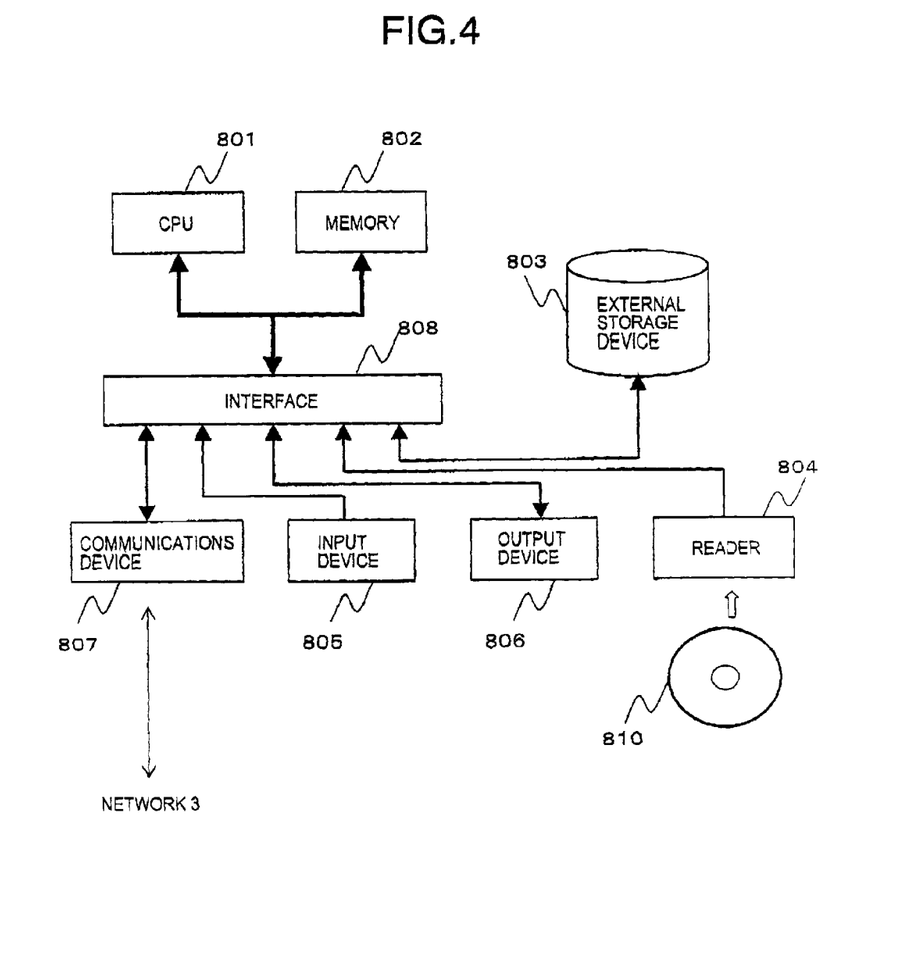
FIG. 4 is a block diagram of a typical hardware configuration of the content distribution center 1 shown in FIG. 2.

The content distribution center 1 can be achieved in hardware using a combination of memory and an integrated logic circuit such as an ASIC or FPGA device. The content distribution center 1 can also be achieved as a software program that runs on a common computer system having a CPU 801, memory 802, external storage device 803 such as a hard disk, a reader 804 for reading data from a CD-ROM or other data storage medium 810, a keyboard or other input device 805, a display or other output device 806, a communications device 807 for communicating with another device via a network 3, and an interface 808 for controlling data communication between these various components. Also, a program for achieving the content distribution center 1 in software is installed to the external storage device 803 from data storage medium 810 by the reader 804, or from the network 3 by the communications device 807, and is then loaded into memory 802 and run by the CPU 801.

A first preferred embodiment of the present invention is described above.

As will be known from the preceding description, a preliminary process, that is, an embedding strength map generating process, run by the preprocessing section 13, and the main process, that is, the watermark data embedding process, run by the main processing section 14, are independent processes in this exemplary embodiment of the present invention. More specifically, the preliminary process run by the preprocessing section 13 is performed every time new content data is stored to the content database 151, and the main process run by the main processing section 14 is performed whenever a content delivery request is received from a receiving terminal 2. The preliminary process is therefore performed only once for the same content data, even when plural receiving terminals 2 request delivery of the same content data. The present invention can therefore efficiently generate watermarked content compared with the watermarked content generating process according to the related art as described above.

Furthermore, the embeddability analyzing process for creating the embedding strength map is applied to at least one of the unit blocks determined according to the watermarking rules, and for each of the remaining unit blocks the allowed change is estimated from the results of the embeddability analyzing process applied to at least one of said unit blocks. Therefore, the unit blocks for which the allowed feature value change is actually measured are the unit blocks to which bits of the watermark data are actually embedded. In other words, unnecessary measurement of the allowed feature value change can be omitted for unit blocks to which the bits of the watermark data are not actually embedded. This process can therefore be accomplished faster than the embedding strength map generating process described according to the related art.

The present embodiment is described using by way of example a case in which the watermarked content generating step of the main processing section 14 is accomplished each time a content delivery request is received from a receiving terminal 2, but the invention shall not be so limited. When the same content is distributed to a plurality of receiving terminals 2, the present invention can be used to change the watermark data for each receiving terminal 2.

While the preprocessing section 13 and main processing section 14 are disposed to the same apparatus in the above preferred embodiment, these cans be allocated to separate apparatuses For example, in the FIG. 1, the content distribution center 1 employs a configuration in which the main processing section 14 is removed in FIG. 2. In this case the requested content (original content data) and corresponding embedding strength map are read from the storage unit 15 in response to a delivery request from a receiving terminal 2, and transmitted to said receiving terminal 2. On the other hand, in FIG. 1, the receiving terminal 2 employs a configuration in which the preprocessing section 13 is removed in FIG. 2, and stores to the storage unit 15 the original content data and corresponding embedding strength map transmitted from the content distribution center 1 in response to a delivery request from the receiving terminal 2. The main processing section 14 is then activated to generate the watermarked content, which is passed through I/O section 11 and delivered to the user at the receiving terminal 2. If the receiving terminal 2 is an on-line terminal installed in a convenience store, for example, an efficient delivery system can be constructed with the processes relating to embedding watermark data (that is, the embedding strength map generating process and the watermark data embedding process) distributed between the content distribution center 1 and receiving terminal 2.

A digital watermark embedding method according to a second preferred embodiment of the present invention is described next below using application in a digital video camera by way of example.

Figure 5:
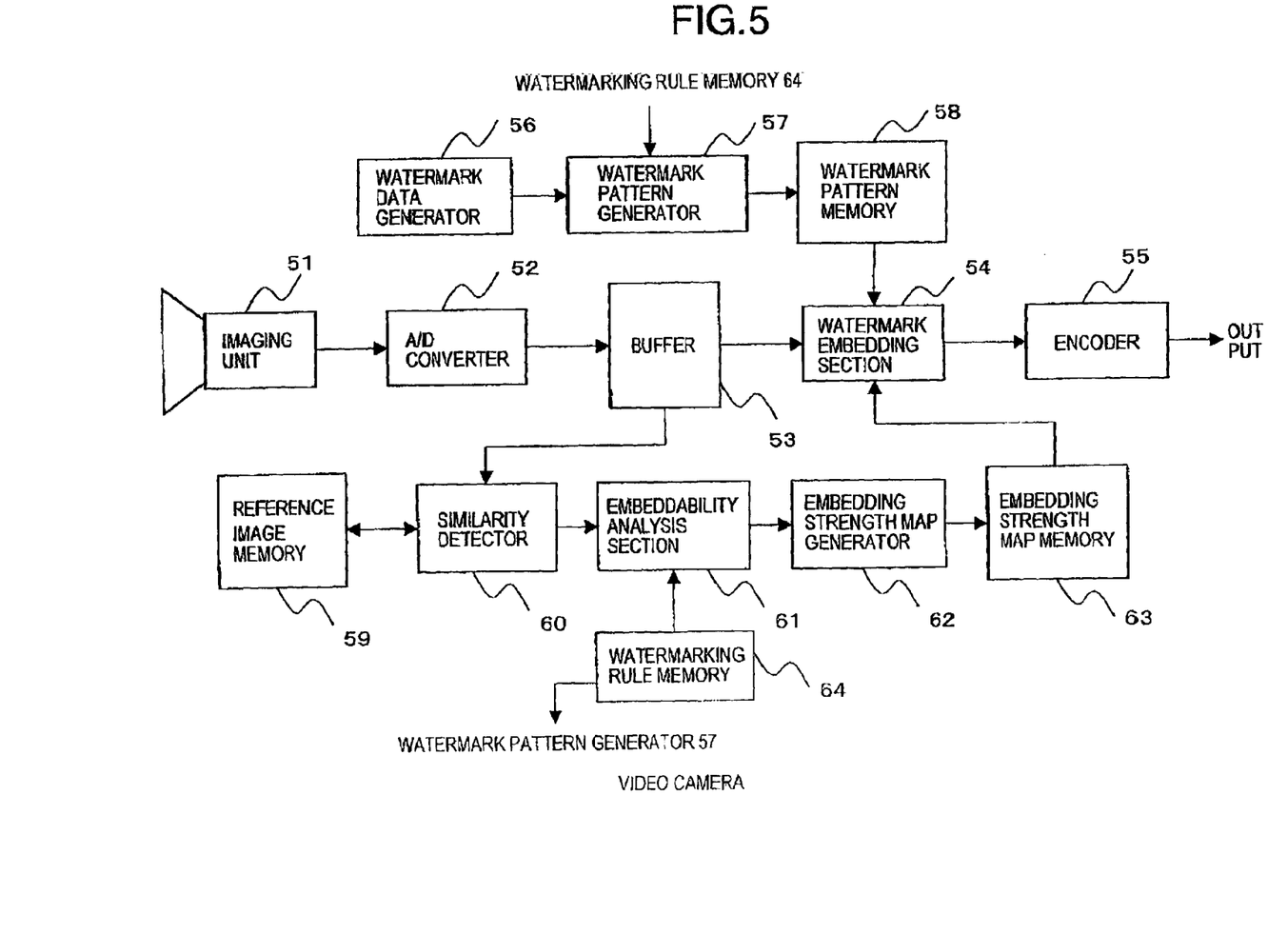
FIG. 5 is a schematic diagram of a video camera in which the second embodiment of the present invention is used.

FIG. 5 is a schematic diagram of a video camera in which this second embodiment of the present invention is applied.

Referring to FIG. 5, a video signal representing the image output from an imaging unit 51 is digitized by A/D converter 52 and converted to digital image data consisting of a sequence of frame data. The frame data is sequentially output from the A/D converter 52 to buffer 53. The buffer 53 has capacity sufficient to hold frame data for at least one image frame, and adjusts the frame data input timing to the watermark embedding section 54.

The watermark embedding section 54 monitors the embedding strength map memory 63. When the content of the embedding strength map memory 63 is updated, the watermark embedding section 54 multiplies the watermark pattern 503 stored to watermark pattern memory 58 with the updated embedding strength map 501 stored to the embedding strength map memory 63 to generate and store watermark pattern 504 shown in FIG. 7. As noted above, the watermark pattern 504 indicates the change in the particular feature value of each unit block in the content and is used to embed each bit of the watermark data 502 to a corresponding unit block in the content data. The watermark pattern 504 and frame data output from the buffer 53 are then merged, thereby changing the feature value of each unit block (the unit blocks to which the watermark data bits are to be embedded) in the frame data the amount of change indicated by the watermark pattern 504 for that unit block. The result is watermarked frame data in which the watermark data is embedded.

The encoder 55 then encodes and outputs the watermarked frame data from watermark embedding section 54 according to the MPEG standard or other protocol.

In a video camera thus comprised storing the watermark pattern to the watermark pattern memory 58 is accomplished as follows before the watermarked frame data is generated.

The watermark data generator 56 generates the watermark data and outputs it to the watermark pattern generator 57. The watermark data in this case includes information about the videographer, for example, input using a control panel or other means not shown in the figures. The watermark pattern generator 57 reads the watermarking rules from the watermarking rule memory 64. As noted above, the watermarking rules control generating the watermark pattern to be embedded in the frame data.

The watermark pattern generator 57 then arranges the bits of the bit sequence representing the watermark data received from the watermark data generator 56 to unit blocks of frame data (the unit blocks to which the bits of the watermark data are to be embedded) determined according to the watermarking rules. This results in a watermark pattern 503 such as shown in FIG. 7. As described above with reference to FIG. 7, +1 indicates an arranged bit with a bit value of 1, −1 indicates an arranged bit with a bit value of 0, and 0 indicates where no watermark data bit is arranged. The resulting watermark pattern 503 is then stored to watermark pattern memory 58.

Storing the embedding strength map to the embedding strength map memory 63 in the above video camera is described next below with reference to the flow chart in FIG. 6.

Similarity detector 60 monitors the buffer 53. When new frame data (the "current frame data" below) is stored to buffer 53 (step S3001), similarity detector 60 detects the similarity between the current frame data and the frame data stored to the reference image memory 59 (referred to as the "reference frame data" below), to determine if the current frame data can be treated as frame data with the same content as the reference frame data (that is, no motion is detected between the image frames) (step S3002). This can be accomplished using a motion prediction process such as that used in MPEG encoding to predict motion in each macroblock of the current frame data relative to the reference frame data. The gum of motion in each macroblock of the current frame data with respect to the corresponding macroblock in the reference frame data is then calculated, and the resulting sum is compared with a specific threshold value. If the sum of motion is less than this threshold value, the current frame data is determined to contain the same content as the reference frame data (that is, there is no motion therebetween), and is thus frame data with a strong correlation (similarity) to the reference frame data. The current frame data is otherwise determined to not contain the same content (that is, there is motion between corresponding frames), and is thus frame data with a weak correlation (similarity) to the reference frame data.

If step S3002 determines that the current frame data is frame data with a strong correlation to the reference frame data (step S3003 returns yes), the similarity detector 60 orders output of the current frame data stored to the buffer 53 to the watermark embedding section 54 (step S3004). Control then loops back to step S3001 and waits for new current frame data to be stored to the buffer 53.

However, if step S3002 determines that the current frame data is frame data with a weak correlation to the reference frame data (step S3003 returns no), the similarity detector 60 instructs the embeddability analysis section 61 to create an embedding strength map.

The embeddability analysis section 61 then reads the watermarking rules from the watermarking rule memory 64. The current frame data is divided into unit blocks, which are the unit areas to which one bit of the watermark data (a bit sequence) is embedded. The allowed change in the feature value (such as luminance value or chrominance value if the content is image data) of a unit block is then obtained, according to the same manner as the embeddability analysis process described above for al least one of unit blocks (unit blocks to which the bits of the watermark data are embedded) defined according to the watermarking rules (step S3005).

Next, for each of the unit blocks determined according to the watermarking rules other than the unit blocks for which the allowed change was obtained in step S3005, the embeddability analysis section 61 estimates the allowed change in the feature value of the unit block based on the allowed change values obtained in step S3005 (step S3006). This is similar to step S1004 in FIG. 3.

The embedding strength map generator 62 writes the allowed change in the feature value of each unit block obtained in step S3005 or estimated in step S3006 to the corresponding unit blocks determined according to the watermarking rules in a map obtained by dividing the content data into the unit blocks as noted above. This is similar to step S1005 in FIG. 3. The result of this step is an embedding strength map 501 as shown in FIG. 7 (step S3007).

Once an embedding strength map 501 is thus compiled, the embedding strength map generator 62 updates the embedding strength map stored in the embedding strength map memory 63 to the new map (step S3008).

Once the updated embedding strength map is stored to the embedding strength map memory 63, the similarity detector 60 updates the reference frame data stored to the reference image memory 59 to the current frame data (step S3009). The buffer 53 is controlled to output the current frame data to the watermark embedding section 54 (step S3004). Control then loops back to step S3001, and the process waits until new current frame data is stored to the buffer 53.

It should be noted that, like the content distribution center 1 described as a first embodiment of the present invention, the digital video camera of this embodiment can be achieved in hardware using a combination of memory and an integrated logic circuit such as an ASIC or FPGA device. It can also be achieved as a software program that runs on a common computer system having a CPU 801, memory 802, external storage device 803, a data reader 804, an input device 805 such as a video player for outputting a video signal containing captured images, a display or other output device 806, and an interface 808 for controlling data communication between these various components as shown in FIG. 4.

A second preferred embodiment of the present invention is described above.

In this exemplary embodiment of the present invention, current frame data sequentially output from an imaging unit 51 is used as content to be watermarked. If the current frame data can be handled as frame data of the same content as the reference frame data, that is, there is no motion between the frames, the embedding strength map compiled for the reference frame data is used as the embedding strength map for embedding watermark data to the current frame data. It is therefore not necessary to actually generate an embedding strength map for each of the plural frame data constituting the content data. Processing is therefore faster compared with a conventional embeddability analyzing process.

This embodiment of a digital watermark embedding method according to the present invention is described with application in a digital video camera, but the invention shall obviously not be so limited. For example, the digital watermark embedding method of the invention can be used in a wide range of electronic devices, including digital video recorders.

When the digital watermark embedding method of the present invention is used in a digital video recorder, an interface for capturing digital video signals is provided in place of the imaging unit 51 and A/D converter 52 in FIG. 5 and a recording section for recording a digital video signal comprising a plurality of watermarked frames is disposed in place of the encoder 55.

This embodiment of our invention as described above detects the similarity between reference frame data and the current frame data sequentially output from the imaging unit 51 as part of the content data, and determines whether to use the embedding strength map for the reference frame data as the embedding strength map for embedding watermark data to the current frame data. The invention shall not, however, be so limited. For example, an embedding strength map can be generated for every n-th frame occurring in the sequential output stream of frame data from the imaging unit 51 and used for embedding watermark data to each subsequent frame until the next embedding strength map is generated.

In this case the reference image memory 59 and similarity detector 60 shown in FIG. 5 are replaced by a counter. The counter is incremented one each time new current frame data is stored to the buffer 53. When the count reaches a specific value, the embeddability analysis section 61 is instructed to generate an embedding strength map and the counter is then reset.

The present invention shall not be limited to the above described embodiments, and the invention can be changed in various ways without departing from the scope of the following claims.

For example, the process performed by the preprocessing section 13 in the first embodiment for creating an embedding strength map can apply an embeddability analyzing process to each part of the content data as described in the related art to obtain the allowed feature value change for each said part. When the content data contains plural frames, such as moving picture data (video), a method as described in the second embodiment can alternatively be used.

Figure 6:
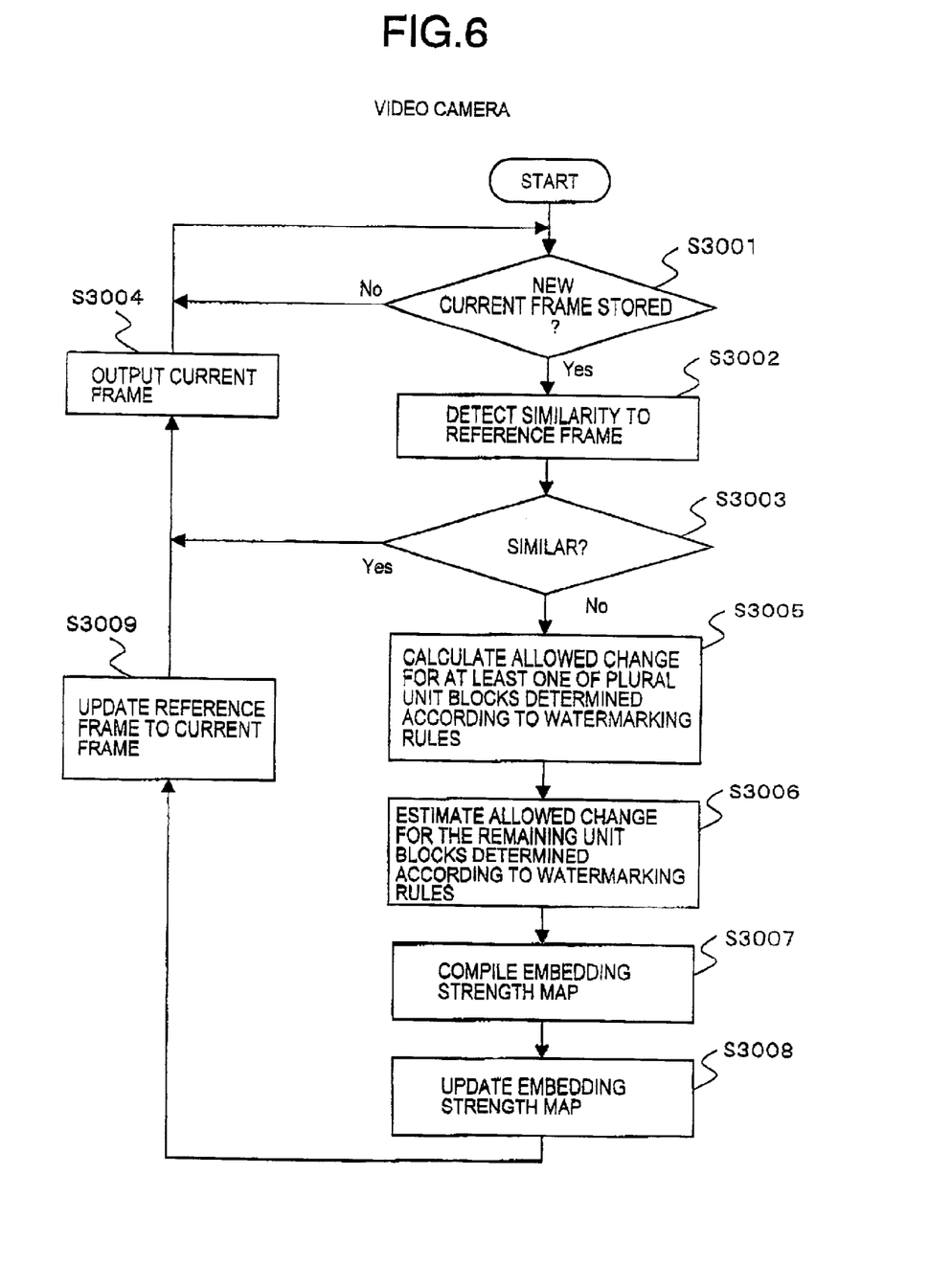
FIG. 6 is a flow chart of the process for storing an embedding strength map to the embedding strength map memory 63 of the video camera shown in FIG. 5.

The process shown in FIG. 6 is run before delivering the content data to compile an embedding strength map suitable for each frame of the content data. These maps are then stored to the embedding strength map database 152 with correlation to the frame data to which each embedding strength map applies.

While these exemplary embodiments of the invention have been described using image data as the content data, the present invention can be applied to various other types of content data, including audio data and text data.

As described above, the present invention reduces the processing load of the embeddability analyzing process required to embed different watermark data to the same content data. In addition, the processing load of the embeddability analyzing process itself is also reduced, The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A digital watermark embedding method for embedding digital watermark data to content data, comprising:

a preliminary process step for applying an embeddability analyzing process to content data before embedding digital watermark data to the content data, compiling an embedding strength map for each part of the content data, and storing said embedding strength map with correlation to the content data, said embedding strength map indicating, for each said part of the content data, an allowed change in a feature value of said part, said allowed change being the change in the feature value allowed for embedding a bit of a bit sequence representing the digital watermark data in said part; and a main process for embedding the digital watermark data in the content data by, for each bit of the bit sequence representing the digital watermark data, changing the feature value of a part in the content data determined according to predetermined rules by an amount determined according to the bit value of said bit and the allowed change in the feature value of said part indicated by the embedding strength map stored for the particular content data;

wherein the main process is accomplished separately from the preliminary process for each of plural different digital watermark data.

2. A digital watermark embeddability analyzing method for generating an embedding strength map indicating for each part of content data an allowed change in a feature value of each said part, said allowed change being the change in the feature value allowed for embedding a bit of a bit sequence representing the digital watermark data in said part of the content data, the embeddability analyzing method comprising:

a first step for obtaining, for at least one embedding part determined according to predetermined rules for embedding bits of the digital watermark data, an allowed change in a feature value of said part of the content data;

a second step for estimating an allowed change in a feature value of each content data part other than said content part for which the allowed change is obtained in the first step based on the allowed feature value change obtained in the first step; and a third step for generating an embedding strength map using the allowed change data obtained in the first step, and the allowed change estimated by the second step.

3. A digital watermark embeddability analyzing method as described in claim 4, wherein the second step uses a digital watermark embeddability analyzing method as described in claim 2 to generate the embedding strength map for frame data captured in the first step.

4. A digital watermark embeddability analyzing method for generating an embedding strength map indicating for each part of content data plural frames of an allowed change in a feature value of said part, said allowed change being change in the feature value allowed for embedding a bit of a bit sequence representing the digital watermark data in said part of the content data, the embeddability analyzing method comprising:

a first step for capturing one unit of frame data satisfying specific conditions in sequence from a beginning of a stream of the plural frames of the content data;

a second step for generating an embedding strength map for each part of the frame data captured in the first step, the embedding strength map indicating a change allowed in a feature value of said part when embedding a bit of the bit sequence representing the digital watermark data in said part; and a third step for allocating the embedding strength map used for all frame data from the frame data used for generating the embedding strength map to the frame data one frame before the new frame data next captured in the first step.

5. A digital watermark embeddability analyzing method as described in claim 4, wherein the first step captures one frame data unit for each specific number of frames in sequence from a beginning of the plural frame data units of the content data.

6. A digital watermark embeddability analyzing method as described in claim 4, wherein the first step detects a degree of similarity between candidate frame data and reference frame data, and if said degree of similarity is less than a specific value, captures the candidate frame data and sets said frame data as the reference frame data for the next candidate frame data.

7. A digital watermark embedding apparatus for embedding digital watermark data to content data, the digital watermark embedding apparatus having a preprocessing section and a main processing section:

the preprocessing section comprising a map generator which applies an embeddability analyzing process to content data and compiling an embedding strength map for each part of the content data, said embedding strength map indicating, for said each said part of the content data, an allowed change in a feature value of said part, said allowed change being the change in the feature value allowed when embedding a bit of a bit sequence representing the digital watermark data in said part, a content database which stores content for which the map generator compiles embedding strength maps, and a map database which stores the maps compiled by the map generator; and the main processing section comprising an input unit which inputs content for delivery to a content user and an embedding strength map for said content from said content database and said map database, a watermark data generator which generates watermark data to be embedded in content obtained by the input unit, said watermark data generated in the same number as content users to whom content is delivered, and a watermarked content generator which generates watermarked content in the same number as content users to whom content is delivered by applying a content watermarking process using each digital watermark generated by the watermark data generator, said content watermarking process generating watermarked content in which a digital watermark is embedded by changing, for each bit of a bit sequence representing the digital watermark, a feature value of a content part determined according to predefined rules an amount determined according to the bit value of said bit and the allowed change in the feature value of said part as indicated by the embedding strength map input by the input unit.

8. A digital watermark embeddability analyzing apparatus for generating an embedding strength map indicating for each part of content data an allowed change in a feature value of each said part, said allowed change being the change in the feature value allowed for embedding a bit of a bit sequence representing the digital watermark data in said part of the content data, the embeddability analyzing apparatus comprising:

a first unit which obtains, for at least one embedding part determined according to predetermined rules for embedding bits of the digital watermark data, an allowed change in a feature value of said part of the content data;

a second unit which estimates an allowed change in a feature value of each content data part for which the allowed change is obtained by the first unit based on the allowed feature value change obtained by the first unit; and a third unit which generates an embedding strength map using the allowed change data obtained by the first unit.

9. A digital watermark embeddability analyzing apparatus for generating an embedding strength map indicating for each part of content data including plural frames of an allowed change in a feature value of said part, said allowed change being a change in the feature value allowed for embedding a bit of a bit sequence representing the digital watermark data in said part of the content data, the embeddability analyzing apparatus comprising:

a first unit which captures one unit of frame data satisfying specific conditions in sequence from a beginning of a stream of the plural frames of the content data;

a second unit which generates an embedding strength map for each part of the frame data captured by the first unit, the embedding strength map indicating a change allowed in a feature value of said part when embedding a bit of the bit sequence representing the digital watermark data in said part; and a third unit which allocates the embedding strength map used for all frame data from the frame data used for generating the embedding strength map to the frame data one frame before the new frame data next captured by the first unit.

10. A data storage medium recording a program for embedding digital watermark data in content data, said program read into and run on a computer to construct therein:

a preprocessing section which applies an embeddability analyzing process to content data before embedding digital watermark data to the content data, compiling an embedding strength map for each part of the content data, and stores said embedding strength map with correlation to the content data, said embedding strength map indicating, for each said part of the content data, an allowed change in a feature value of said part, said allowed change being the change in the feature value allowed for embedding a bit of a bit sequence representing the digital watermark data in said part of the content data; and a main processing section which embeds the digital watermark data in the content data by, for each bit of the bit sequence representing the digital watermark data, changing a feature value of a part in the content data determined according to predetermined rules by an amount determined according to the bit value of said bit and the allowed change in the feature value of said part indicated by the embedding strength map stored for the particular content data;

wherein the main processing section is separate from the preprocessing section for each of plural different digital watermark data.

11. A data storage medium recording a program for generating an embedding strength map indicating for each part of content data an allowed change in a feature value of each said part, said allowed change being the change in the feature value allowed for embedding a bit of a bit sequence representing the digital watermark data in said part of the content data, said program read into and run on a computer to construct therein:

a first unit which obtains, for at least one embedding part determined according to predetermined rules for embedding bits of the digital watermark data, an allowed change in a feature value of said part;

a second unit which estimates an allowed change in a feature value of each content data part for which the allowed change is obtained by the first unit based on the allowed feature value change obtained by the first unit; and a third unit which generates an embedding strength map, and the allowed change estimated by the second unit.

12. A data storage medium recording a program for generating an embedding strength map indicating for each part of content data including plural frames of an allowed change in a feature value of said part, said allowed change being a change in the feature value allowed for embedding a bit of a bit sequence representing the digital watermark data in said part of the content data, said program read into and run on a computer to construct therein:

a first unit which captures one unit of frame data satisfying specific conditions in sequence from a beginning of a stream of the plural frames of the content data;

a second unit which generates an embedding strength map for each part of the frame data captured by the first unit, the embedding strength map indicating a change allowed in a feature value of said part when embedding a bit of the bit sequence representing the digital watermark data in said part; and a third unit which allocates the embedding strength map used for all frame data from the frame data used for generating the embedding strength map to the frame data one frame before the new frame data next captured by the first unit.

* * * * *